US007941231B1

(12) United States Patent
Dunn (10) Patent No.: US 7,941,231 B1
(45) Date of Patent: May 10, 2011

(54) AMBIENT NOISE LEVEL SAMPLING SYSTEM FOR COOLING AN ELECTRONIC DEVICE

(75) Inventor: Christopher Lorenzo Dunn, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 643 days.

(21) Appl. No.: 11/964,880

(22) Filed: Dec. 27, 2007

(51) Int. Cl.
*G05B 11/01* (2006.01)
*H05K 7/20* (2006.01)
*G01P 1/02* (2006.01)
*G01P 15/00* (2006.01)
*G01H 1/00* (2006.01)
*G01H 11/00* (2006.01)
*G01M 1/22* (2006.01)
*G01M 13/00* (2006.01)
*G01N 29/00* (2006.01)

(52) U.S. Cl. ........... 700/17; 700/21; 73/493; 73/514.01; 73/660; 361/695

(58) Field of Classification Search .................. 700/17, 700/21; 73/493, 514.01, 660; 361/695
See application file for complete search history.

(56) References Cited

U.S. PATENT DOCUMENTS

| 5,757,937 | A | | 5/1998 | Itoh et al. | |
|---|---|---|---|---|---|
| 5,926,386 | A | * | 7/1999 | Ott et al. ........................ | 700/70 |
| 5,929,581 | A | * | 7/1999 | Van Brocklin et al. ....... | 318/471 |
| 6,472,848 | B2 | | 10/2002 | Stryker et al. | |
| 6,735,499 | B2 | | 5/2004 | Ohki et al. | |
| 6,781,258 | B2 | * | 8/2004 | Hashimoto ..................... | 307/87 |
| 6,836,849 | B2 | | 12/2004 | Brock et al. | |
| 6,935,130 | B2 | | 8/2005 | Cheng et al. | |
| 6,965,175 | B2 | | 11/2005 | Hu et al. | |
| 2004/0120113 | A1 | * | 6/2004 | Rapaich ......................... | 361/687 |
| 2004/0141620 | A1 | | 7/2004 | Mahoney | |
| 2005/0069144 | A1 | * | 3/2005 | Delchar et al. ............... | 381/71.3 |
| 2005/0211426 | A1 | | 9/2005 | Ziarnik et al. | |
| 2008/0019220 | A1 | * | 1/2008 | Sutardja ........................ | 369/1 |
| 2009/0092261 | A1 | * | 4/2009 | Bard ............................. | 381/71.1 |

FOREIGN PATENT DOCUMENTS

JP   2004252531 A  *  1/2004

OTHER PUBLICATIONS

Translation of JP 2004252531A; Printed from Japan Patent Office Website; 12 pages; printed on Jul. 16, 2010.*
Chin et al., "Arctic Coolin Freezer 7 Pro HSF," submitted to www.silentpcreview.com on Nov. 28, 2005, 5 pages.

* cited by examiner

*Primary Examiner* — Ronald D Hartman, Jr.
(74) *Attorney, Agent, or Firm* — Charles D. Huston; Daffer McDaniel, LLP (57) ABSTRACT

An electronic device is provided that is able to detect noise to which the electronic device is exposed and an internal temperature of the device. The device contains a cooling unit to cool at least a portion of the electronic device and a subsystem coupled to the microphone and/or a thermal sensor and further coupled to the cooling unit. The cooling unit adjusts according to the detected noise and internal temperature. A method for cooling an electronic device is also provided. The method comprises monitoring the noise of the device's ambient environment, monitoring an internal temperature of the device, and actuating a user interface. The method provides for cooling the device by adjusting fan speed, clock speed, or power supply voltage applied to the device based on the noise of the ambient environment, an internal temperature of the device, and actuation of the user interface.

20 Claims, 5 Drawing Sheets

AMBIENT NOISE LEVEL SAMPLING SYSTEM FOR COOLING AN ELECTRONIC DEVICE

BACKGROUND OF THE INVENTION

1. Field of the Invention

This invention relates to electronic devices and, more particularly, to cooling systems for electronic devices.

2. Description of the Related Art

The following descriptions and examples are not admitted to be prior art by virtue of their inclusion within this section.

Exposure to excessive heat can shorten the life of or lead to the failure of electronic components. As a result, most electronic devices include active cooling systems to thermally manage their internal temperatures. These cooling systems employ methods of heat removal such as forced air flow or thermoelectric cooling to cool the components of the computer that are most likely to experience excessive heat. The most common form of active cooling in computers involves the use of a fan to force the flow of lower temperature ambient air through the device to cool the components that generate the most heat. Generally, processors and power supplies are most threatened by exposure to excessive heat. Cooling systems have evolved to become more sophisticated, and most now use temperature sensors to logically adjust fan speed. Newer cooling systems implement temperature control schemes that typically focus on either maximizing the cooling capacity of the system by increasing fan speed and air flow and by reducing the amount of heat generated by limiting the performance of the computer.

A negative attribute of many active cooling systems that use one or more fans to cool a computer is that the fan(s) can produce a large amount of noise which may become bothersome to the user. Cooling systems may achieve quieter cooling by opening air passages and rerouting airflow, increasing fan speed, limiting the amount of heat that the computer generates, or some combination thereof. With respect to particularly compact electronic devices, such portable personal computers (PCs), having components that are packaged very close together, it may be difficult to modify air flow through any means other than increasing fan speed. Limiting the amount of heat generated by an electronic device may be possible, but this solution is usually accompanied by the unwanted side effect of limiting the performance and processing power of the device. Since cooling systems that emit too much noise can be bothersome to a user, existing cooling systems are generally designed to operate below a selected noise level. The selected noise level may be determined by empirical or ergonomic testing to determine a target noise level at which the device will operate based on the acceptable sound level for an exemplary operating environment. For instance, a desktop computer may be assumed to operate in a relatively quiet office environment, so its cooling system may be configured to operate below a selected noise level that is considered to be acceptable for an office environment. The amount of noise emitted by the desktop computer may be limited by modifying cooling system parameters such as fan speed and air flow. In other words, the computer may be designed so that its cooling system will not emit more noise than the selected noise level that corresponds to the anticipated operating environment.

SUMMARY OF THE INVENTION

Considering the acoustic noise level to be a fluctuating characteristic of an electronic device's operating environment may allow for a more sophisticated cooling system. Such a cooling system may be more efficient in terms of allowing a device to have a more compact design and maximizing performance while still minimizing the extent to which a user is subjected to the discomfort resulting from a high level of noise output. Accordingly, it may be desirable to create a cooling system that is capable of considering and reacting to additional external factors such as the audible noise level of the surrounding ambient environment.

Accordingly, an electronic device is provided, comprising a microphone, a sensor, and a cooling unit. The microphone may be used to detect noise to which the electronic device is exposed, the sensor may be used to detect an internal temperature of the electronic device, and the cooling unit may cool at least a portion of the electronic device. The electronic device also comprises a subsystem coupled to an output of the microphone and/or sensor and further coupled to an input of the cooling unit for adjusting the amount of cooling depending on the amount of noise and/or heat registered by the microphone and/or sensor.

In another embodiment, an electronic device comprises a microphone for detecting acoustic energy, a sensor for detecting thermal energy, and a cooling unit for cooling at least a portion of the electronic device. This embodiment also comprises a user interface for controlling the cooling unit and an amount of cooling depending on user input upon the user interface and, at times when the user interface is absent change, for controlling the cooling unit depending on an output from the microphone and/or sensor.

A method for cooling an electronic device is also provided. The cooling method comprises reading ambient noise surrounding the electronic device, reading temperature of at least a portion of the electronic device, and actuating a user interface. The cooling method also comprises cooling the electronic device by adjusting fan speed, clock speed, or power supply voltage applied to the electronic device based on; said first reading; said second readings; and said actuating.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but are instead intended to cover all modifications, equivalents and alternatives falling within the spirit and scope of the present invention as defined by the appended claims.

DETAILED DESCRIPTION OF THE PREFERRED EMBODIMENTS

A cooling system is provided that is capable of considering and reacting to the audible noise level of the surrounding ambient environment for the purposes of minimizing the amount of noise perceived by a user as a result of cooling system operation. The cooling system may increase or decrease its cooling capacity based on the noise level of the surrounding environment, and may also be configured to allow a user to manually control the amount of noise generated by a cooling system based on personal preference.

As noted above, the cooling systems of many computers and other electronic devices include fans to force air from the surrounding ambient environment over a heat exchanger, such as a heat sink, to dissipate the heat generated by the electronic device. These fans are generally noisier at higher speeds and therefore, cooling system noise emissions may increase corresponding to the cooling capacity of the system. In general, the amount of noise generated is a function of, among other things, the speed at which the fans operate and the number of fans in use.

Early designs for computer cooling systems employed a simple constantly running fan. In these designs, the fan served to cool areas of the device that generate the most heat and are most susceptible to heat related damage, such as processors and power supplies. Cooling systems were made more efficient by including a thermal sensor near heat sensitive areas to monitor the local temperature of the system and output the temperatures of the computer to the cooling system. A cooling system equipped with a thermal sensor is able to activate a cooling fan when the local temperature reaches a certain threshold temperature and deactivate the cooling fan when the temperature drops below a lower threshold temperature. With respect to noise level, this means that the fan would either be off and quiet, or on and noisy. The concept of using a thermal sensor to trigger an "on/off" switch can be improved upon by inserting intermediate threshold temperatures to correspond with intermediate fan speed settings. In other words, when a first upper threshold temperature is reached, the fan is triggered to operate at a lower rotational speed, and if the temperature reaches a second upper threshold then fan speed may increase to a higher rotational speed. The natural progression of this cooling system concept results in an approximately linear relationship between fan speed and the sensed temperature. In terms of the amount of noise emitted by the cooling system, a cooling system of this type will begin to operate quietly and become gradually noisier as temperature and, in response, fan speed increase.

It is noted that a cooling system that is able to linearly vary fan speed in response to measured temperatures requires a control method involving operational logic. A simplification of such a cooling system would have a control circuit comprising a fan and a processor connected through an interface between the processor and the fan. The processor, functioning to control the fan, should receive a measured temperature from a thermal sensor, determine a fan speed based on an index or relationship of fan speeds that corresponds to measured temperatures, and generate a corresponding control signal. The control signal is then communicated to the fan via a control interface, and the fan functions according to the received signal, thereby varying fan speed in correspondence with the measured temperature. This type of cooling system can serve to decrease the amount of noise emitted from the cooling system because the fan operates at maximum speed less frequently. Accordingly, the amount of noise that is associated only with the excess fan speed is not generated. Also, since there are no abrupt changes in fan speed, the amount of noise emitted by the cooling system increases and decreases gradually. Thus, while the cooling system is still likely to be perceived as loud by a user, the graduated increases and decreases make it less likely to be abruptly bothersome. An advantage of the adjustable fan is that the amount of noise emitted is only increased as required to neutralize increases in temperature. Sudden changes in cooling system noise emissions may be reduced by employing a cooling system with an adjustable fan, and the cooling system is less prone to emitting more noise than necessary. However, the cooling system may still be perceived as loud to the user relative to the ambient environment.

Perceived loudness of the cooling system may be caused by the fact that the cooling system does not adapt its operating characteristics in response to the noise level of the computer's operating environment. The noise level of the operating environment should be a variable that is considered in the design if cooling systems are to operate at noise levels that are more comfortable for users. Restated, this means that to minimize the discomfort experienced by a user as a result of noise emitted by the cooling system, the noise level of the computer's ambient environment should be considered as a design factor. Since electronic devices, such as desktop computers, laptop computers, and tablet computers, are used in a wide variety of work environments, there may be a significant variation in the perceived loudness of the cooling system. For instance, if a computer operates in a board room or quiet office environment, a marginal amount of noise may be considered bothersome. Conversely, if the computer is used in loud environment such as a manufacturing facility or a vehicle, the cooling system may emit a considerable amount and still not be perceived as bothersome.

Perhaps the most important consideration in cooling system design is the amount of heat that the computer generates. This amount of heat is directly related to the processing capability of the computer. Microprocessor power dissipation is approximately exponentially proportional to the voltage across the chip and linearly proportional to the clock frequency at which the processor operates. Because the power supply voltage of the processor also functions to constrain clock frequency, processing speed may also increase with voltage. Thus, both clock speed and voltage will normally increase along with processing power. This means that higher performance processors will generally generate more heat than lower performance processors. In compact electronic devices, such as tablet PCs, dissipating additional heat produced by a high performance processor may be challenging because components are very tightly packaged, making it difficult to improve airflow. One technique used to keep these types of electronic devices from overheating is to reduce the amount of heat generated to a level that can a cooling system can practically dissipate. This technique involves limiting power supply voltage and clock frequency so that the processor will generate less heat, which will in turn make the computer easier to cool, and is termed "throttling." "Throttling" is used to describe the technique of decreasing the internal voltage of an electronic device and scaling back the clock speed of the processor in order to decrease heat generation and minimize the risk of thermal damage. Throttling back the processor decreases the amount of heat that must be dissipated and allows the computer to be effectively cooled without increasing the cooling capacity of the cooling system. Like temperature sensitive fan cooling systems, cooling systems that employ throttling are usually programmed to throttle their operating speed for the purposes of limiting heat generation and reducing the potential for thermal destruction when the processor reaches a threshold temperature. Cooling systems may also control power dissipation by putting processors into an inactive, or "sleep," state when their processing is not required. This kind of control may also be used to deactivate heat producing subsystems aside from the processor, so that power management software can temporarily shut down an entire subsystem when such a partial shut down is advantageous.

Many modern computer cooling systems are designed with a maximum noise level in mind. This is accomplished by configuring the cooling system to use a combination of throttling back the processor or other electronic subsystems and increasing fan speed when the temperature of the computer reaches particular threshold temperatures. In some situations, the fan of the cooling system may adequately cool the computer. However, because the amount of noise emitted is a function of fan speed, the existence of a maximum noise level may necessitate a corresponding limit on fan speed in some circumstances. Thus, when the fan is operating at maximum speed, the processor must be throttled to limit the rate of heat generation to a level than can be effectively cooled. In this way, computers that employ throttling may emit less noise because of their ability to trade off heat generation for processing power.

While it may be important for a computer to operate quietly in many environments, there are operating environments in which a quiet computer will be unappreciated. For instance, a quiet computer may be greatly appreciated in a quiet office. However, in a loud environment, such as an airport terminal, the cooling system may be quite noisy and still go unnoticed. In these louder environments, throttling the computer may unnecessarily limit the performance of the computer because the user is not made more comfortable by quieter operation. When the operating environment is loud, the preferred method of cooling the computer may be to increase the capacity of the cooling system by increasing fan speed. This may allow the computer to operate at a higher speed, which in many circumstances is of more utility to the user than a quieter cooling system. It follows that a more sophisticated cooling system should consider the noise level of the ambient environment, so that the extent to which throttling is used to cool the computer instead of increasing fan speed will vary based on the noise level of the ambient environment.

For some computers, designing a cooling system to operate quietly relative to the ambient environment may be relatively straightforward. For instance, desktop personal computers (PCs) may generally be expected to operate in a fixed environment such as an office or home office for most of their service lives. For these types of computers, a narrower range of operating environments may be expected, and an acceptable amount of noise may be accurately estimated based on a hypothetical operating environment. This allows a cooling system to be designed to maximize performance without producing an amount of noise that a user will consider unacceptable or distracting. Further, since desktops are not generally subject to the same size and component spacing constraints that apply to portable computers, they can be designed with better and bigger channels for airflow and corresponding heat dissipation so that throttling may not be needed at all.

The design of cooling systems for compact electronic devices, such as tablet PCs, may be much more critical. Components of these devices are generally more compact and spaced closer together, which limits the ability of their cooling systems to remove heat. These types of electronic devices can also be expected to operate in a much wider range of operating environments. For example, an engineer may use a tablet PC or laptop computer for a field application (a noisy environment), and may subsequently use the same computer in a quieter office environment. Similarly, many business travelers use a single compact computer to work in both quiet office environments and noisy transit environments, including airplanes, airports, and other loud environments. For these types of devices, it may be desirable to configure a cooling system that is able to react to the noise level of the ambient environment.

A solution to the performance and noise problems outlined above involves sampling the ambient noise level of the device's operating environment. Here, sampling refers to the reduction of a continuous signal, the sounds from the ambient environment, to a discrete signal. While audio sampling is typically used to record sounds for the purposes of regenerating the sound from a digital signal, it is employed in this context to periodically monitor the noise level of the operating environment. This type of sampling may be accomplished by using either a dedicated onboard microphone or a microphone that is already available for general audio input to generate an electrical signal that corresponds to the noise level. This ambient noise level signal may be used, in addition to temperature, as a criteria for selecting cooling system operating parameters such as fan speed, number of fans operating, and pump speed (for liquid cooling systems). More simply put, the cooling system may determine whether the environment is quiet and cause the computer to operate quietly. Similarly, the cooling system may determine when the environment is noisy and allow the computer to emit more noise, allowing for increased cooling capacity and increased processing capability.

Figure 1:
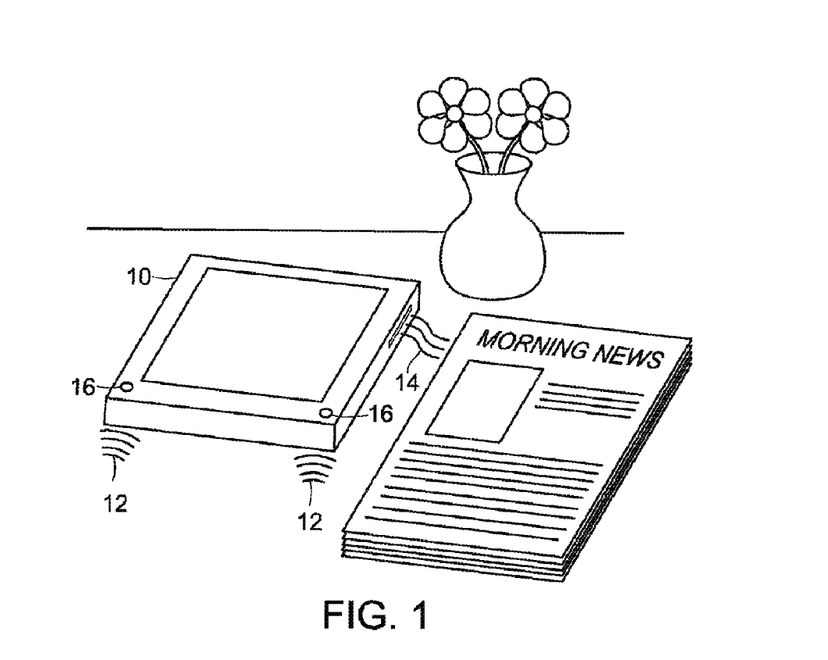
FIG. 1 is a perspective view of an electronic device operating in a quiet environment.

Turning to the drawings, FIG. 1 is a perspective view drawing of an electronic device operating in a quiet environment, for example, a home office. Here, the electronic device is exemplified by a tablet PC 10. The tablet PC 10 has microphones 16 that generate an electronic signal based on the sounds 12 of the ambient operating environment. The microphones 16, acting as transducers, detect acoustic noises and convert those noises into electrical signals that correspond in magnitude to the acoustic noise level of the ambient environment. Based on the volume of the incoming sounds 12 of the ambient environment and the low magnitude of the corresponding electrical signal, the computer's cooling system operates at a low noise level. Accordingly, the computer 10 is effectively cooled by limiting the amount of heat generated by the computer so that the fan can cool the computer without operating at a high speed, thereby emitting only a small amount of noise 14.

Figure 2:
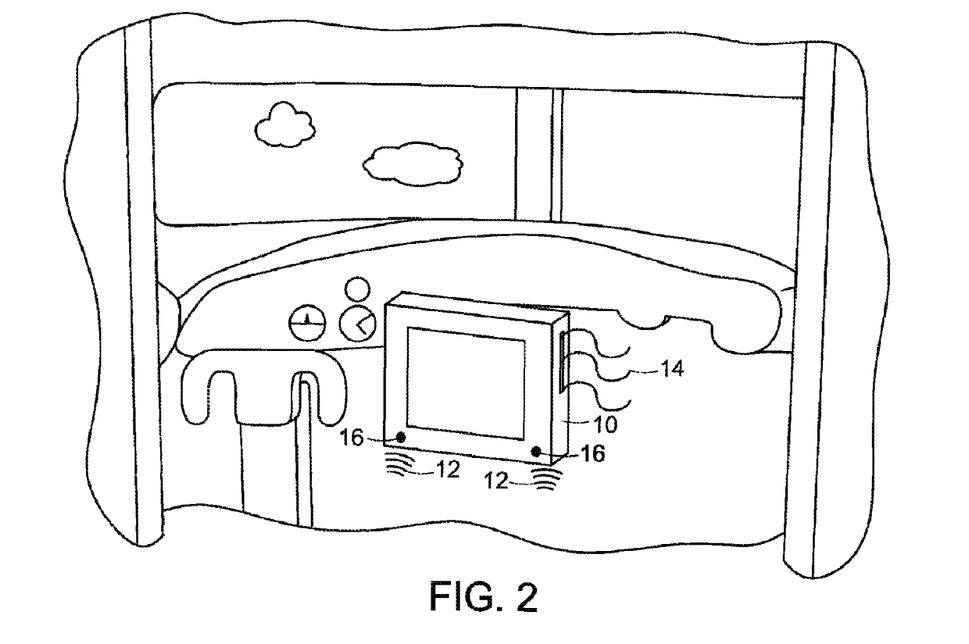
FIG. 2 is a perspective view of an electronic device operating in a loud environment.

FIG. 2 is a perspective view drawing of an electronic device operating in a very loud environment, for example, a small aircraft. The electronic device is exemplified here by a tablet PC 10. The PC 10 has microphones 16 that generate an electronic signal based on the sounds 12 of the ambient operating environment. The microphones 16, acting as transducers, detect acoustic noises and convert those noises into electrical signals that correspond in magnitude to the acoustic noise level of the ambient environment. Because the high detected noise level and large magnitude of the corresponding electrical signal, the cooling system does not limit the performance of computer's processor in this circumstance and instead cools the computer by increasing fan speed. The resulting increase in noise emitted 14 by the cooling system should go unnoticed in this environment, and the increased fan speed will increase the cooling capacity of the computer so that processing power of the computer 10 may be maximized.

Figure 3:
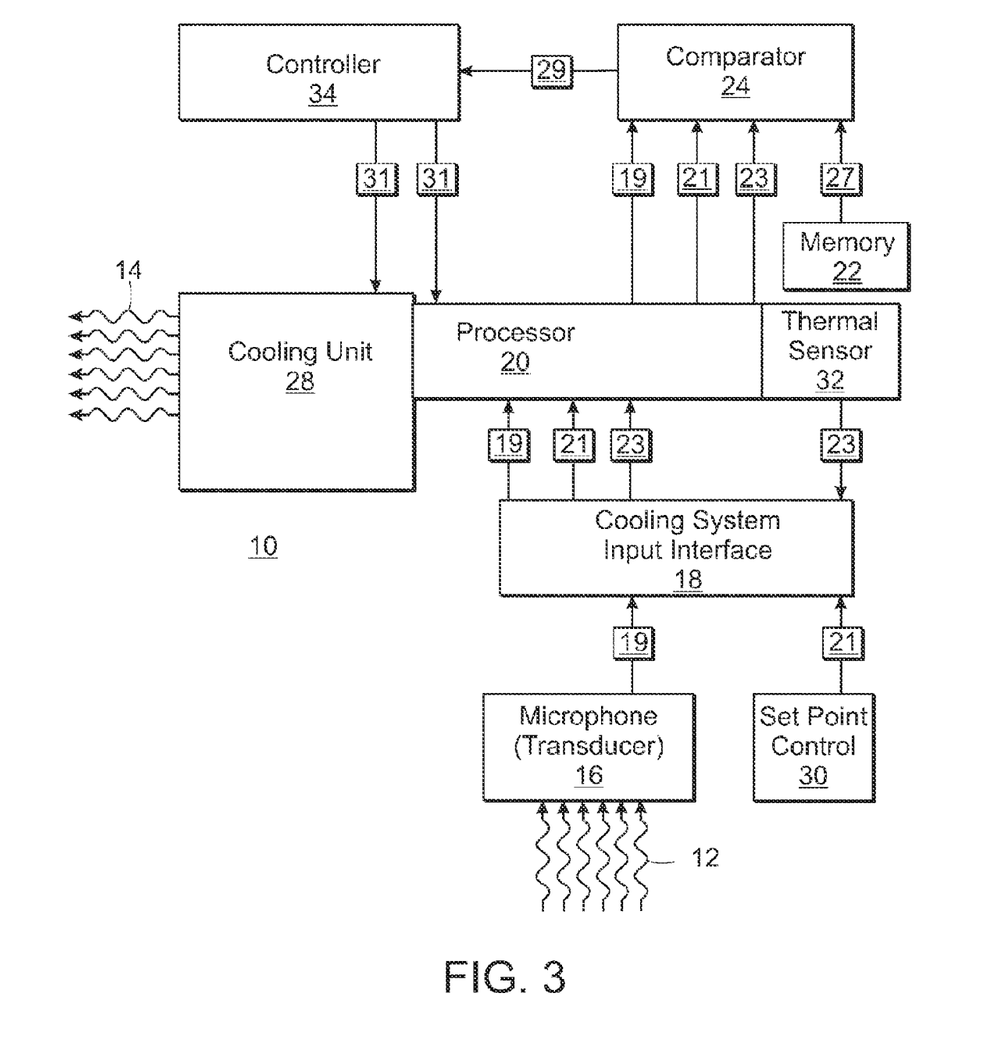
FIG. 3 is a block diagram of at least a part of an electronic device.

FIG. 3 is a block diagram of at least a part of an electronic device, such as a tablet PC 10. In FIG. 3, an input signal is generated either by a user's operation of a set point control 30 or from sounds 12 detected in the ambient environment. Input from the set point control 30 generates a corresponding digital noise level signal 21. Input from the operating environment may also be generated by a microphone 16 that operates as a transducer to monitor the sounds 12 of the ambient environment and generate a corresponding electrical signal 19. Both microphone 16 and set point control 30 communicate their inputs (19 and 21) to a cooling system input interface 18.

The cooling system input interface may be an electronic interface that communicates the cooling system inputs to the processor 20, and may be implemented in a way that enables the cooling system to function as a component of the devices BIOS so that it will not require a higher level operating system in order to function. The cooling system input interface 18 may also receive input from a thermal sensor 32 located near the processor that monitors the temperature of the computer and generates a corresponding temperature signal 23. The processor 20 receives the noise level input signals 19 and 21 and thermal sensor input 23.

The electronic device 10 also contains a memory 22 that functions to store an index of benchmark cooling system configurations 27 that corresponds to various anticipated noise level inputs and temperatures. The index of cooling system configurations 27 may be stored in memory 22 in tabular form, or in the form of an algorithm. The processor 20 communicates noise level inputs signals 19 and 21 along with the temperature signal 23 to a comparator 24. The processor 20 also functions to actuate the communication of the index of benchmark cooling system configurations 27 to the comparator 24. Based on the operating mode of the cooling system, the comparator 24 compares either the set point noise level input signal 21 or the microphone noise level input signal 19 and temperature input signal 23 against an index of cooling system configurations 27, and selects a corresponding cooling system configuration 29. Here, "cooling system configuration," refers to a group of operating parameters for the cooling system, including the extent to which the processor is throttled back and the speed of the cooling fan. The computer also has a cooling unit 28 that is thermally coupled to the processor 20. The configuration signal 29 selected by the comparator 24 is sent to a controller 34 that operates to send corresponding control signals 31 to the processor 20 and cooling unit 28 in order to cool the device 10 in such a way that the noise level of the sound emitted 14 by the cooling system will vary according to user input or the noise level of the ambient environment.

It is noted that the cooling system may be configured to operate based on input from the set point control 30, the microphone 16, or a combination of both. The set point control 30 may be a knob, dial, a touch sensitive interface, or a graphical user interface (GUI). The cooling system may also be configured to operate in an entirely automated fashion. In this case, the cooling system may function by considering only noise level input related to sounds 12 from the ambient environment and input from the thermal sensor 32 to determine the cooling system configuration. The cooling system may also operate in a completely manual mode, and determine a configuration based only on input received from the thermal sensor 32 and set point control 30. Here, a user may indicate a desired noise level with the set point control 30, and the noise level of the ambient environment 12 will be ignored.

It may also be desirable to operate the cooling system in a mode that considers both the set point control input and noise level of the ambient environment. In this mode of operation, the cooling system may consider one noise level input, and switch to operate by considering the other noise level input based on a user changing the set point control or the detected noise level rising above or dropping below pre-selected thresholds. This mode of operation may consider only the noise level detected by the microphone 16 until a user adjusts the set point control 30, when the cooling system may switch to operate by considering input from the set point control 30 instead of input generated by the microphone. If the device is restarted or has been idle for an extended amount of time, the cooling system may return to its original mode of operating according to the noise level of the ambient environment.

Figures 4, 4A:
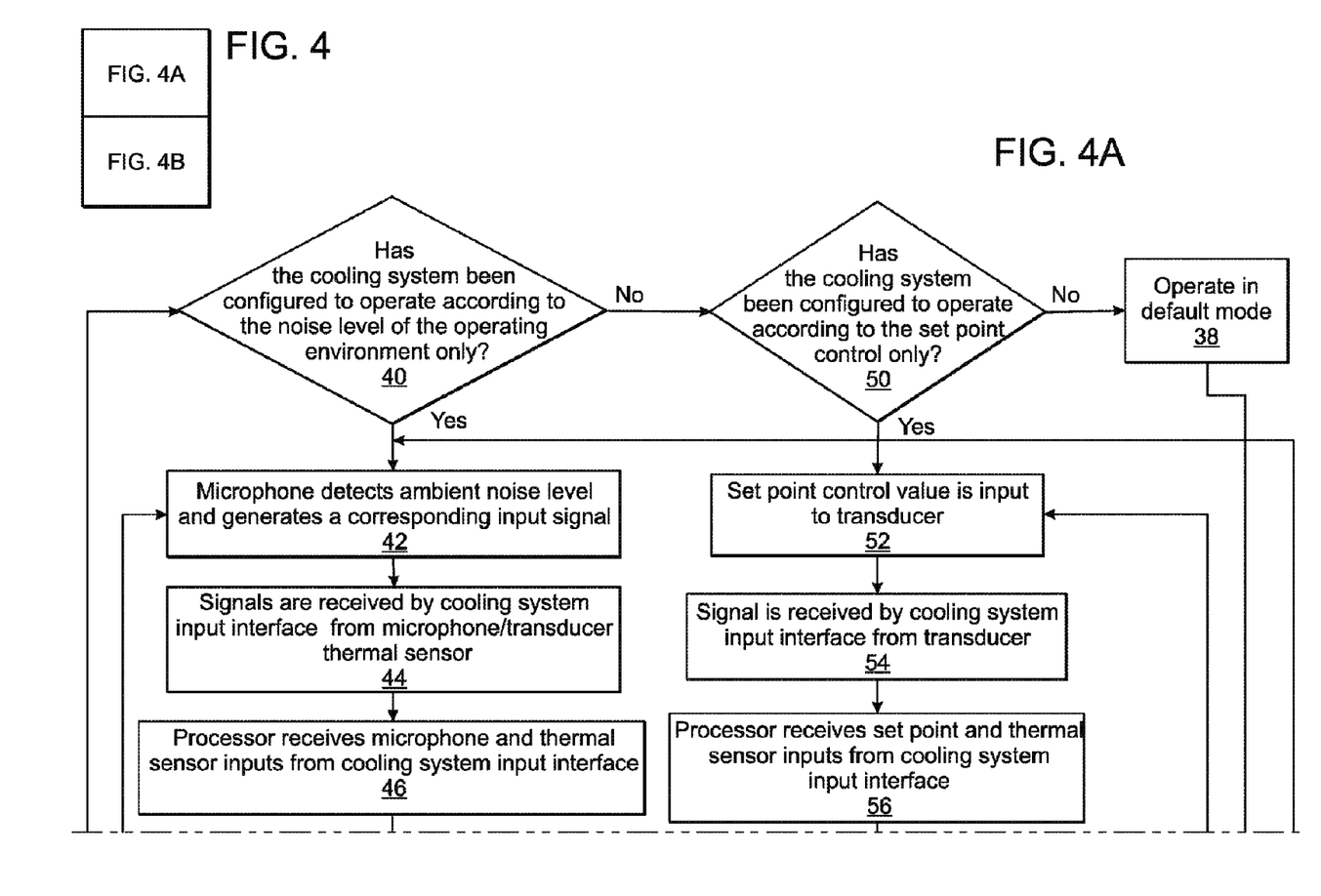
FIGS. 4A-4B illustrate a flow chart showing the operation of a cooling system.
Figure 4B:
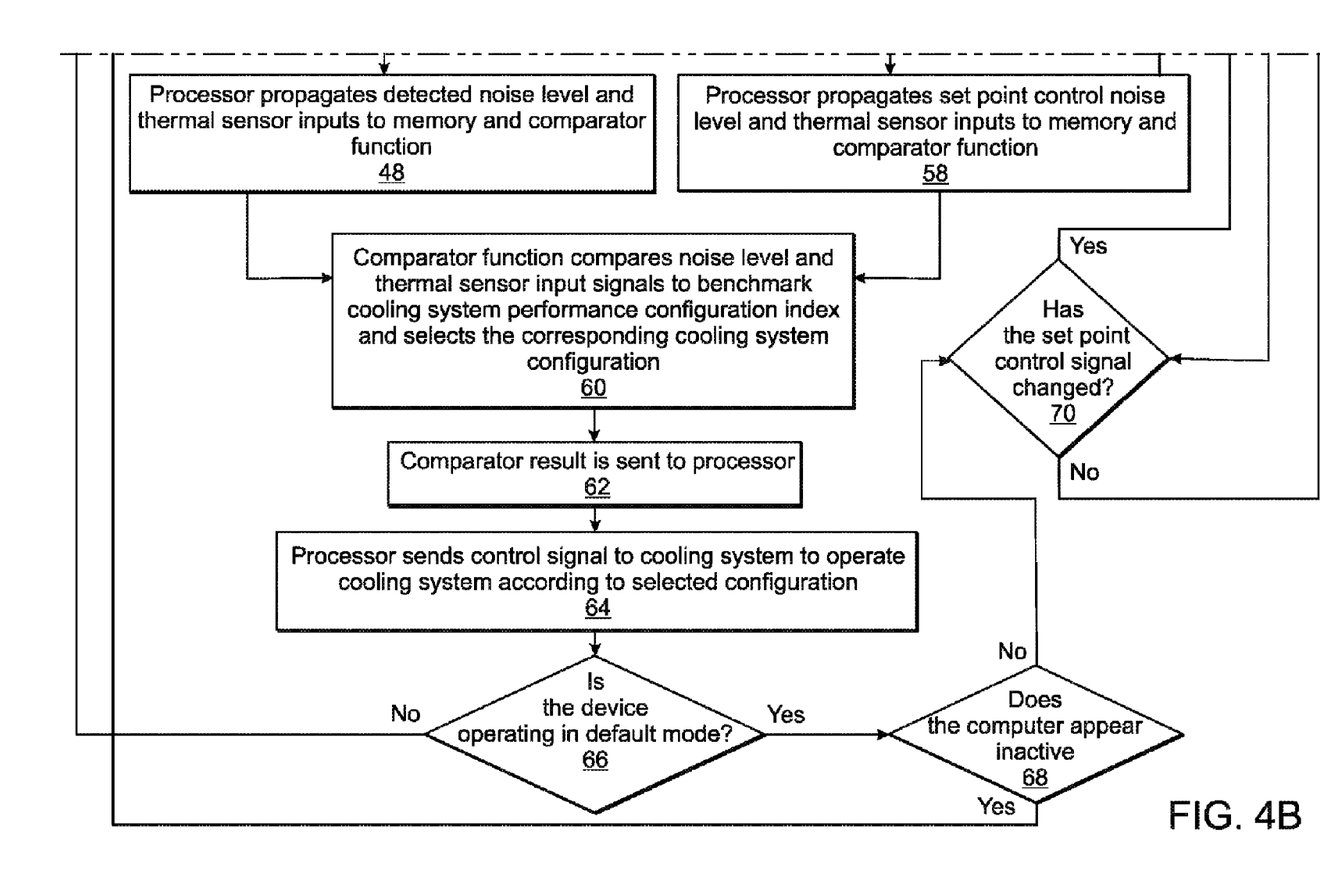

FIGS. 4A-4B depict a flow chart showing the operating procedure of an embodiment of the cooling system. First, a determination is made as to whether the cooling system has been configured to operate by considering the noise level of the operating environment 40. If the cooling system has been configured to operate by considering the noise level of the operating environment, then a microphone will detect the ambient noise and generate a corresponding input signal 42. This signal, along with a signal from the thermal sensor, is sent via the cooling system input interface 44 and subsequently to the processor 46. Next, the processor may propagate the detected noise level and thermal sensor input signals to the comparator along with an indexed table of cooling system configurations that have been benchmarked to ideally correspond to the anticipated range of noise levels and temperatures 48. The comparator function may compare the input signals to the index of cooling system configurations and select the cooling system configuration that corresponds to the propagated signals 60. The result from the comparator is then sent to the processor 62, which then functions to send a control signal to the components of the cooling system so that it will operate according to the selected configuration 64. The cooling system may continue to monitor the noise level of the ambient environment in conjunction with the temperature of the processor and periodically repeat the aforementioned steps until the cooling system is configured to operate differently.

If the cooling system has been configured to operate based on input from the set point control 50, then the transducer coupled to the set point control will generate an input signal based on the set point control setting 52. This signal may be communicated through the system to the cooling system input interface 54 along with input from the thermal sensor and subsequently to the processor 56. The processor then communicates the temperature and selected noise level inputs to the comparator function along with an index stored in memory that contains cooling system configurations that have been benchmarked to ideally correspond to the range of selectable noise levels and temperatures 58. Next, steps 60-64 (as outlined above) are performed to configure the cooling system. The cooling system continues to monitor the noise level setting and temperature inputs, and periodically repeats the aforementioned steps until the cooling system is configured to operate differently.

If a user has not specifically selected a mode in which the cooling system should operate, there may also be a default mode that takes advantage of both the set point control input and the noise level of the operating environment 38. Here, if a user has not adjusted the set point control 70, then the cooling system may operate as if the system has been configured to function in accordance with the detected noise level of the operating environment until a user adjusts the set point control 70. When a user has adjusted the set point control, the cooling system may change its operating state and operate based on the signal generated from the set point control. In the default mode of operation, when the set point control has not been adjusted for an extended period and the computer appears to be inactive, the cooling system may return to operating based on the signal generated from the noise level of the operating environment.

In some embodiments, it may be desirable to briefly shut off the cooling system to enable clear sampling of the ambient noise level without sampling the noise associated with the cooling system. Also, the signals received from the microphone may pass through a filtering system that is capable of filtering ambient noise from intended audio input to the electronics system (for example, spoken commands). There are many existing techniques for determining the magnitude of the ambient noise while filtering out transient sounds such as voices, car horns, or other abrupt non-sustained noise. For example, a filtering algorithm or a filter circuit may be used to filter the noise of the ambient environment from the noise generated by the cooling system itself. This could be done by the system having a stored characterization of the cooling system noise or by sampling ambient noise with the cooling system (briefly) deactivated. The cooling system may be more effective when filtering is employed because it may more accurately take into account the operating environment's noise reflection and absorption characteristics. A more sophisticated implementation may evaluate the composition of the ambient noise and measure noise in the same frequencies as the noise produced by the product's cooling system. If several elements in the cooling system have individual noise profiles, they could each be controlled independently depending on whether or not the ambient noise would mask the noise they produce.

The cooling system may be implemented with a higher level operating system, the computer's BIOS or software resident in lower level cooling electronics. When a higher level operating system such as Microsoft Windows Vista or Linux is fully booted, it may control the cooling system. When a higher level operating system is not operational, the computer's BIOS or lower level cooling control electronics may have set of basic cooling system configurations that function to control the cooling system. However, the higher level operating system allows for the cooling system to be controlled by customizable and pre-stored cooling system configurations. For instance, the cooling control software may be implemented in a lower level microprocessor. That processor may shift modes of operation based on commands received from a cooling system application, such as a control panel type interface. However, if the operating system crashes, the cooling system may continue to function based on commands from a lower level operating system.

In another embodiment the cooling may be equipped to operate based on a number of pre-stored cooling system configurations. The cooling system is then able to operate based on pre-stored configurations, custom configurations, or manual configurations. Examples of pre-stored configurations are constant fan speed, variable fans speeds based only on temperature sensor input, and configurations based on detected noise levels and temperatures. The cooling system may also be provided with a graphical user interface, such as a Microsoft Windows type control panel, to enable a user to configure settings for the cooling system via the operating system of the computer. Using the control panel, a user may be able to select a particular cooling system configuration based on a variety of inputs in addition to the noise level of the operating environment and the temperature of the computer. For example, a user may create a configuration that allows the computer to maximize processing power and operate at higher noise levels when an application that places a high load on the processor is running. Similarly, a user may create a cooling system configuration that causes the computer to operate quietly when another application is running if the application requires less processing power and the user prefers for the computer to operate more quietly when that application is running. This allows the user to uniquely configure the cooling system of the computer based on personal preference.

Figure 5:
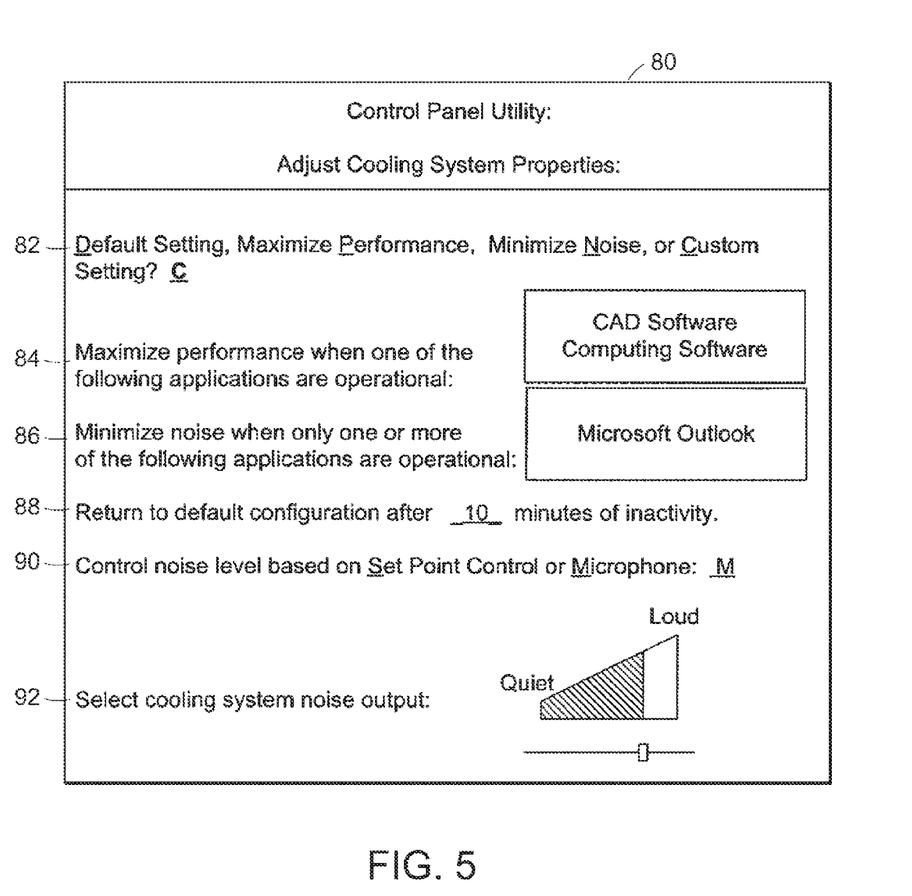
FIG. 5 is a representation of a user interface of a cooling system.

FIG. 5 shows an example of a control panel utility window for a user interface. When a user wishes to modify the cooling system settings, they may open a control panel utility window 80. Here, a user may select whether the cooling system operates according to the default configuration, a configuration that maximizes performance, a configuration that minimizes noise output, or a custom configuration by keying in a letter that corresponds to the selected configuration 82. The user may also populate a list of programs or applications that, if active, will cause the cooling system to operate at full capacity 84. Similarly, the user may populate a list of programs or applications that, if they are the only active applications, will cause the cooling system to operate according to its most quiet configuration. The cooling system may also be set to return to its default configuration after a specified amount time of inactivity has elapsed 10. A user may also use the control panel to operate the cooling system according to the noise level input of either the set point control or the microphone by indicating a preference in the control panel 90. Finally, the control panel may include a graphical user interface for the set point input 92.

Unlike prior cooling systems, the present cooling system operates to minimize noise output while maintaining allowable operating temperatures. When the device is configured to operate more quietly, it may also consume less power. Thus, the cooling system relates changes in the noise level of a device's ambient operating environment to changes in fan speed and noise output. An interface is provided to measure the changes in ambient noise level, select a cooling system configuration that corresponds to the ambient noise level, and output control signals to control the cooling system accordingly. The cooling system is able to take advantage of changes in the noise level of the ambient environment in order to minimize the extent to which a user perceives the amount of noise that is attributable to the cooling system of the computer. In sum, a device, system and method for providing active control of cooling system components while also taking into account the noise level of the ambient operating environment are disclosed. This provides for detection of the noise level and minimization of the effect on a user of noise that is attributable to the cooling system. This method for cooling an electronic device may be applied to computers and other types of devices. Specifically, the method may be implemented in any electronic device with an active cooling system that operates in environments with highly variable noise levels.

Those skilled in the art will readily observe that numerous modifications and alterations of the device may be made while retaining the teachings of the invention. Accordingly, the above disclosure should be construed as limited only by the metes and bounds of the appended claims.

What is claimed is:
1. An electronic device, comprising:
  a microphone for detecting noise to which the electronic device is exposed;
  a sensor for detecting heat to which at least a portion of the electronic device is exposed;
  a cooling unit for cooling at least a portion of the electronic device; and
  a subsystem coupled to outputs of the microphone and the sensor and further coupled to an input of the cooling unit for adjusting an amount of cooling provided by the cooling unit depending on the amount of noise and heat respectively registered by the microphone and the sensor, wherein the subsystem comprises:

a processor coupled to the input of the cooling unit for receiving noise and heat signals from the microphone and sensor, respectively;

a memory coupled to the processor for storing a table of noise and heat values corresponding to a plurality of cooling system configuration values; and a comparator coupled for receiving the noise and heat signals sent to the processor, comparing, in magnitude, those noise and heat signals with the table of noise and heat values stored within the memory, and conveying a cooling system configuration value corresponding to the received noise and heat signals from among the plurality of cooling system configuration values to the processor.

2. The electronic device as recited in claim 1, wherein the cooling unit comprises a fan, and wherein the processor further comprises an input for receiving the cooling system configuration value and for conveying a control signal to the fan for modifying a speed of the fan.

3. The electronic device as recited in claim 1, wherein the cooling unit comprises a controller coupled to the processor, and wherein the processor further comprises an input for receiving the cooling system configuration value and for conveying a control signal to the controller for modifying at least one of a clock speed of the processor and a voltage supplied to the processor.

4. The electronic device as recited in claim 1, further comprising a user interface which, when activated by a user, overrides at least one of the outputs from the microphone and the sensor for adjusting the amount of cooling based solely on user input upon the user interface.

5. The electronic device as recited in claim 1, further comprising:

a user interface; and a set point control unit coupled between the user interface and the processor for instructing the processor to adjust the amount of cooling: (i) based on input to the user interface in lieu of the outputs of the microphone and the sensor during a first time, and (ii) based on the outputs of the microphone and the sensor in lieu of input to the user interface during a second time.

6. The electronic device as recited in claim 5, wherein the amount of cooling always occurs by default during the second time unless user input is applied to the user interface.

7. An electronic device, comprising:

a microphone for detecting acoustic energy;

a sensor for detecting thermal energy;

a cooling unit for cooling at least a portion of the electronic device; and a graphical user interface for controlling the cooling unit and an amount of cooling depending on user input supplied to the graphical user interface and, at times when the graphical user interface is absent change, for controlling the cooling unit depending on an output from at least one of the microphone and the sensor.

8. The electronic device as recited in claim 7, wherein the microphone is coupled to receive acoustic energy impinging upon the electronic device, and wherein the sensor is coupled to receive thermal energy from at least one subcomponent of the electronic device.

9. The electronic device as recited in claim 7, further comprising:

a processor coupled to an input of the cooling unit;

a memory coupled to the processor for storing a table comprising cooling system configuration values corresponding to respective noise and heat values; and a comparator coupled between the memory, the processor, the microphone and the sensor for comparing the acoustic and thermal energy readings taken from the microphone and sensor, respectively, with noise and heat values within the table, to determine a corresponding cooling system configuration value, and for forwarding the cooling system configuration value to the cooling unit.

10. The electronic device as recited in claim 7, further comprising:

a processor coupled to an input of the cooling unit;

a memory coupled to the processor for storing a table comprising cooling system configuration values corresponding to respective noise and heat values; and a comparator coupled between the memory, the processor and the graphical user interface for comparing set point values from the graphical user interface with noise and heat values stored within the table to determine a corresponding cooling system configuration value, and for forwarding the cooling system configuration value to the cooling unit.

11. The electronic device as recited in claim 7, wherein said graphical user interface is configured to receive user input for selecting whether the cooling unit operates according to a default configuration, a configuration that maximizes performance of the cooling unit, a configuration that minimizes noise output from the cooling unit, or a custom configuration.

12. The electronic device as recited in claim 7, wherein said graphical user interface is configured to receive user input for selecting one or more applications that cause the cooling unit to operate at maximum performance, and wherein said graphical user interface is configured to receive user input for selecting one or more applications that cause the cooling unit to operate at its most quiet configuration.

13. The electronic device as recited in claim 7, wherein said graphical user interface is configured to receive user input for controlling a noise level output from the cooling unit based the output from the microphone or a set point control, which enables a user to set the noise level output to a desired level.

14. A method for cooling an electronic device comprising a processor, wherein the method comprises:

reading ambient noise surrounding the electronic device;

reading temperature of at least a portion of the electronic device;

actuating a user interface; and cooling the electronic device by supplying at least one signal from the processor to adjust at least one of a fan speed, a clock speed, or a power supply voltage applied to at least one subcomponent of the electronic device, wherein said at least one signal is selected by said processor based on (i) said first reading, (ii) said second reading, and (iii) said actuating.

15. The method of claim 14, wherein said reading ambient noise surrounding the electronic device comprises using a microphone to generate an electrical signal corresponding to the ambient noise surrounding the electronic device.

16. The method of claim 14, wherein said reading temperature of at least a portion of the electronic device comprises using a thermal sensor coupled to a subcomponent of the electronic device to generate an electrical signal corresponding to a temperature of the subcomponent or a temperature of the ambient environment surrounding the subcomponent.

17. The method of claim 14, wherein said actuating a user interface comprises manipulating a set point control to generate a desired noise level signal.

18. The method of claim 17, wherein said cooling is controlled based on said first reading when the electronic device is idle, and wherein said cooling is controlled based on said actuation when the set point control is manipulated.

19. The method of claim 18, wherein said cooling results in the emission of an amount of noise that varies in relation to said first reading when the electronic device is idle.

20. The method of claim 18, wherein said cooling results in the emission of an amount of noise that varies in relation to said actuating when the set point control is manipulated.

* * * * *